United States Patent
Baric et al.

(10) Patent No.: US 10,590,361 B2
(45) Date of Patent: Mar. 17, 2020

(54) PROCESS FOR PREPARING A HYDROWAX

(71) Applicant: SHELL OIL COMPANY, Houston, TX (US)

(72) Inventors: John Joseph Baric, Amsterdam (NL); Nicolaas Van Dijk, Amsterdam (NL); Laurent Georges Huve, Amsterdam (NL)

(73) Assignee: SHELL OIL COMPANY, Houston, TX (US)

( * ) Notice: Subject to any disclaimer, the term of this patent is extended or adjusted under 35 U.S.C. 154(b) by 20 days.

(21) Appl. No.: 14/652,224

(22) PCT Filed: Dec. 17, 2013

(86) PCT No.: PCT/EP2013/076837
§ 371 (c)(1),
(2) Date: Jun. 15, 2015

(87) PCT Pub. No.: WO2014/095813
PCT Pub. Date: Jun. 26, 2014

(65) Prior Publication Data
US 2015/0322364 A1    Nov. 12, 2015

(51) Int. Cl.
| | | |
|---|---|---|
| *C10G 65/12* | (2006.01) | |
| *C10M 101/02* | (2006.01) | |
| *C10G 73/44* | (2006.01) | |
| *C10G 47/16* | (2006.01) | |
| *B01J 29/076* | (2006.01) | |
| *B01J 23/882* | (2006.01) | |
| *B01J 29/16* | (2006.01) | |

(52) U.S. Cl.
CPC ........ *C10M 101/025* (2013.01); *B01J 23/882* (2013.01); *B01J 29/076* (2013.01); *B01J 29/166* (2013.01); *C10G 47/16* (2013.01); *C10G 65/12* (2013.01); *C10G 73/44* (2013.01); *C10G 2300/301* (2013.01)

(58) Field of Classification Search
CPC .. C10M 101/025; B01J 29/076; B01J 29/166; B01J 23/882; C10G 47/16; C10G 65/12; C10G 73/44; C10G 2300/301
See application file for complete search history.

(56) References Cited

U.S. PATENT DOCUMENTS

| | | | | |
|---|---|---|---|---|
| 4,435,275 | A | * 3/1984 | Derr | ............. C10G 65/12 208/111.1 |
| 5,122,257 | A | 6/1992 | Van Helden et al. | |
| 5,139,647 | A | 8/1992 | Miller | |
| 6,171,474 | B1 | 1/2001 | Kasztelan et al. | |
| 6,576,120 | B1 | 6/2003 | Van Ballegoy et al. | |
| 2009/0095651 | A1* | 4/2009 | Leonard | ............. C10G 65/12 208/49 |
| 2010/0116712 | A1* | 5/2010 | Dziabala | ............. C10G 65/12 208/57 |

FOREIGN PATENT DOCUMENTS

| | | |
|---|---|---|
| EP | 0214717 | 3/1987 |
| EP | 0310165 | 4/1989 |
| EP | 0697455 | 2/1996 |
| WO | 9201657 | 2/1992 |
| WO | 9201769 | 2/1992 |

OTHER PUBLICATIONS

US Oil & Refining Co. ("Product Specification Vacuum Gas Oil", http://www.usor.com/files/pdf/5/VGO.pdf, Jun. 2014).*
Minderhoud, J.K. et al.; "First-stage hydrocracking: process and catalytic aspects"; Fuel Processing Technology; vol. 35;, No. 1-2; pp. 87-110; Sep. 1, 1993.

* cited by examiner

*Primary Examiner* — Brian A McCaig
*Assistant Examiner* — Jason Y Chong

(57) ABSTRACT

The invention provides a process for preparing a hydrowax comprising the steps of: (a) providing a hydrocarbonaceous feedstock which contains more than 4% by weight of hydrocarbons boiling in the range of from 550 to 800° C.; (b) hydrotreating the hydrocarbonaceous feedstock with a hydrotreating catalyst in the presence of a hydrogen-containing gas under hydrotreating conditions to obtain a hydrotreated product; (c) hydrocracking at least part of the hydrotreated product as obtained in step (b) with a hydrocracking catalyst in the presence of a hydrogen-containing gas under hydrocracking conditions to obtain a hydrocracked product, which hydrocracking catalyst contains a zeolitic component which is present in an amount of at least 14 wt %, based on the total weight of the hydrocracking catalyst, and wherein the volume ratio of the hydrotreating catalyst as used in step (b) and the hydrocracking catalyst is more than 1; and (d) recovering from the hydrocracked product as obtained in step (c) the hydrowax.

9 Claims, No Drawings

PROCESS FOR PREPARING A HYDROWAX

PRIORITY CLAIM

The present application is the National Stage (§ 371) of International Application No. PCT/EP2013/076837, filed Dec. 17, 2013, which claims priority from European Patent Application 12197603.9, filed Dec. 17, 2012 incorporated herein by reference.

FIELD OF THE INVENTION

The present invention relates to a process for preparing a hydrowax.

BACKGROUND OF THE INVENTION

Hydrowax is paraffinic fraction with a boiling point typically in the range of 340 to 560° C. which is obtainable from a hydrocracker. Hydrowax can for instance be used for the production of lubricating base oils and as a feedstock for producing lower olefins. Typically, a hydrowax is obtained by subjecting a refinery distillation fraction to a hydrotreating step and subsequently a hydrocracking step.

In EP 0 697 455 A2, a process is described for producing a hydrowax in which process a blend of a flashed distillate and a hydrodemetallised deasphalted oil is subjected to hydrocracking over a stacked bed of a conventional first stage hydrocracking catalyst (NiMoP on alumina) on top of a dedicated second hydrocracking catalyst (NiW on amorphous silica-alumina). The hydrowax thus obtained can be used as the feedstock for a steam cracker to produce ethylene and propylene or as a feedstock for a dewaxing unit or hydroprocessing unit for producing lubricating base oils.

Generally, a higher conversion in the hydrocracker improves the quality of hydrowax as feedstock for a steam cracker or as feed for a base oil plant. However, a higher conversion also means that the hydrowax yield of the hydrocracker becomes smaller.

A drawback of the known processes to produce hydrowaxes is that a higher conversion reduces substantially the ratio of heavy hydrowax over light hydrowax, which in turn reduces substantially the ratio of heavy lubricating base oils over light lubricating base oils.

At a constant level of conversion, a heavier feed to the hydrocracker will result in a heavier hydrowax. However, in order to maintain the hydrowax quality for a heavier hydrocracker feed its conversion level has to be raised which in turn reduces the the ratio of heavy hydrowax over light hydrowax.

Object of the present invention is to provide a process which at a given feed heaviness and conversion level results in a higher ratio of heavy hydrowax to light hydrowax.

SUMMARY OF THE INVENTION

Accordingly, the present invention provides a process for preparing a hydrowax comprising the steps of:
(a) providing a hydrocarbonaceous feedstock which contains more than 4% by weight of hydrocarbons boiling in the range of from 550 to 800° C.;
(b) hydrotreating the hydrocarbonaceous feedstock with a hydrotreating catalyst in the presence of a hydrogen-containing gas under hydrotreating conditions to obtain a hydrotreated product;
(c) hydrocracking at least part of the hydrotreated product as obtained in step (b) with a hydrocracking catalyst in the presence of a hydrogen-containing gas under hydrocracking conditions to obtain a hydrocracked product, which hydrocracking catalyst contains a zeolitic component which is present in an amount of at least 14 wt %, based on the total weight of the hydrocracking catalyst, and wherein the volume ratio of the hydrotreating catalyst as used in step (b) and the hydrocracking catalyst is more than 1; and (d) recovering from the hydrocracked product as obtained in step (c) the hydrowax.

In accordance with the present invention a higher ratio of heavy hydrowax to light hydrowax can attractively be obtained when compared with conventional processes.

DETAILED DESCRIPTION OF THE INVENTION

The hydrocarbonaceous feedstock as provided in step (a) contains preferably more than 8% by weight of hydrocarbons boiling in the range of from 550 to 800° C. More preferably, the hydrocarbonaceous feedstock contains between 8-30% by weight of hydrocarbons boiling in the range of from 550 to 800° C. In the hydrocarbonaceous feedstock as provided in step (a) the ratio of the fraction of hydrocarbons boiling in the range of from 370-543° C. and the fraction of hydrocarbons boiling in the range of from 550 to 800° C. is preferably less than 25. The hydrocarbonaceous feedstock useful in the process of the present invention may be either heavy gas oil fractions obtained from the atmospheric distillation of a crude oil or flashed distillate fractions obtained from the vacuum flash distillation or vacuum distillation of an atmospheric hydrocarbon oil residue. For the purpose of the present invention it is not strictly required to use sharply defined distillate fractions (such as obtained in vacuum distillation) and therefore it is preferred that the distillate fractions are produced by the less expensive vacuum flash distillation of an atmospheric hydrocarbon oil residue.

At least part of the hydrocarbonaceous feedstock as provided in step (a) can suitably be a blend obtained by blending at least one distillate fraction, preferably a vacuum distillate fraction, and a deasphalted oil (DAO). The DAO that can be used is suitably obtained by deasphalting a residual hydrocarbon oil, preferably a vacuum residue. The deasphalting may be carried out in any conventional manner. A well known and suitable deasphalting method is solvent deasphalting, which involves the countercurrent treatment of the residual hydrocarbon oil feed with an extracting solvent. This extracting solvent usually is a light hydrocarbon solvent containing paraffinic compounds having 3 to 8 carbon atoms, such as propane, butane, isobutane, pentane, isopentane, hexane and mixtures of two or more of these. Preferred paraffinic hydrocarbons are those having 3 to 5 carbon atoms with butane, pentane and mixtures thereof being most preferred. The solvent deasphalting treatment is conveniently carried out in a rotating disc contactor or a plate column with the residual hydrocarbon oil feed entering at the top and the extracting solvent entering at the bottom. The lighter hydrocarbons present in the residual hydrocarbon oil dissolve in the extracting solvent and are withdrawn at the top of the apparatus. From this top-fraction, the DAO is obtained after recovery of the extracting solvent. The asphaltenes, which are insoluble in the extracting solvent, are withdrawn at the bottom of the apparatus. The conditions under which deasphalting takes place are known in the art. Suitably, deasphalting is carried out at a total extracting solvent to residual hydrocarbon oil ratio of 1.5-8 wt/wt, a pressure of 1-50 bar and a temperature of 160-230° C.

The deasphalted oil may be obtained by deasphalting a distillate fraction, preferably a vacuum distillate fraction, containing hydrocarbons that have a boiling point in the range of from having a 550-800° C. At least part of the deasphalted oil may be derived from a coking unit in which a feed containing hydrocarbons boiling in the range of 370-543° C. are processed.

In step (b), the hydrocarbonaceous feedstock is hydrotreated with a hydrotreating catalyst in the presence of a hydrogen-containing gas under hydrotreating conditions to obtain a hydrotreated product.

In step (c), at least part of the hydrotreated product as obtained in step (b) is hydrocracked with a hydrocracking catalyst in the presence of a hydrogen-containing gas under hydrocracking conditions to obtain a hydrocracked product, which hydrocracking catalyst contains a zeolitic component which is present in an amount of at least 14 wt %, preferably in the range of from 18-30 wt %, based on the total weight of the hydrocracking catalyst, and wherein the volume ratio of the hydrotreating catalyst as used in step (b) and the hydrocracking catalyst is more than 1.

Preferably, the volume ratio of the hydrotreating catalyst as used in step (b) and the hydrocracking catalyst is more than 1.5, more preferably in the range of from 2-4.

The zeolitic component preferably comprises a zeolite Y. Preferably, the zeolite has a Si/Al ratio in the range of from 8-50.

Suitably, the hydrocracking catalyst also comprises an amorphous silica-alumina in an amount of less than 50 wt %, preferably less than 45 wt %, and more preferably in the range of from 20-40 wt %, based on the total weight of the hydrocracking catalyst.

In the context of the present invention the amounts of the zeolitic component and the amorphous silica-alumina are determined on the basis of the total weight of the hydrocracking catalyst in the fresh oxidic state.

Typical examples of the hydrocracking catalyst are NiW/zeolite and NiW/zeolite/silica-alumina.

The hydrocracking catalyst may also contain a promoter in the form of phosphorus (P).

Suitable hydrocracking conditions in steps (c) include a temperature in the range of from 350-460° C., preferably in the range of from 370-420° C.; a pressure in the range of from 80-240 bar, preferably in the range of from 150-210 bar; and a weight hourly space velocity in the range of from 0.4-7 $hr^{-1}$, preferably in the range of from 2-5 $hr^{-1}$.

For the purpose of the present invention the hydrocracking process can be a single- or a multiple-staged process. In the case of a single-staged process, a stacked bed of a hydrodenitrification/first-stage hydrocracking catalyst on top of the conversion catalyst can suitably be used. Particularly suitable hydrodenitrification/first-stage hydrocracking catalysts are NiMo/alumina and CoMo/alumina, optionally promoted with phosphorus and/or fluorine.

The conversion hydrocracking catalyst is the hydrocracking catalyst which contains the zeolitic component which is present in an amount of at least 14 wt %, as described hereinabove.

Preferably, the entire hydrotreated product as obtained in step (b) is subjected to the hydrocracking in step (c).

Suitably, at least part of the hydrocracked product as obtained in step (c) is recycled to step (b).

The hydrowax in accordance with the present invention is very useful as a feedstock for a thermal steam cracker to produce lower olefins.

Thermal steam cracking is a known method for producing lower olefins, particularly ethene and to a somewhat lesser extent propene. It is a strongly endothermic process and basically involves heating a hydrocarbon oil feed to a sufficiently high temperature for cracking reactions to occur followed by rapid cooling of the reactor effluent and fractionation of this effluent into the different products. A steam cracker, also commonly referred to as an ethene cracker, usually consists of a hot section and a cold section. The hot section consists of cracking furnaces, a cooling section and a primary fractionator for separating the effluent in a cracked residue, pan oil, cracked gas oil and cracked gas. Steam is introduced into the cracking furnace to dilute the feed. This is favourable for the final olefin yield, while the added steam also suppresses the deposition of coke in said furnace. In the cold section the cracked gas is further separated into the various end products among which are pure ethene and propene. In general, this separation is achieved by first compressing the cracked gas from the primary fractionator to a pressure of about 30-40 bar followed by cooling the compressed gas to temperatures below −100° C. to enable separation into the various pure end products. The removal of gases such as carbon dioxide and hydrogen sulphide also takes place in the cold section of the steam cracker. Because of the strong endothermic nature of the steam cracking process adequate and efficient heat recovery is very important in order to make the process economically viable.

The hydrowax in accordance with the present invention is very useful as a feedstock for producing lubricating base oils.

The hydrowax recovered in step (d) is therefore suitably subjected to a dewaxing step. Preferably, the hydrowax recovered in step (d) is subjected to a dewaxing step and the dewaxed product thus obtained is subjected to a hydrofinishing step. The dewaxing step may be a solvent dewaxing step or a catalytic dewaxing step. Preferably, the dewaxing step is a catalytic dewaxing step. Hence, in a particular attractive embodiment of the present invention the hydrowax recovered in step (d) is subjected to a catalytic dewaxing step and the dewaxed product thus obtained is subjected to a hydrofinishing step.

The hydrowax recovered in step (d) has a high viscosity index (VI) which enables the production of high VI lubricating base oils.

By catalytic dewaxing is here meant a process for decreasing the pour point of lubricating base oil products by selectively converting the components of the oil feed which impart a high pour point to products which do not impart a high pour point. Products which impart a high pour point are compounds having a high melting point. These compounds are referred to as waxes. Wax compounds include for example high temperature melting normal paraffins, isoparaffins and mono-ringed compounds. The pour point is preferably reduced by at least 10° C. and more preferably by at least 20° C. The hydrocarbon oils to be used as feed in the process according to the present invention will thus contain waxy molecules which impart an undesirable high pour point. Small amounts of these compounds can strongly influence the pour point. The feed will suitably contain between about 1% and up to 100% of these waxy compounds.

In the catalytic dewaxing step in accordance with the invention the hydrowax is contacted under catalytic dewaxing conditions with a catalyst composition comprising metallosilicate crystallites, a binder and a hydrogenation component.

Catalytic dewaxing conditions are known in the art and typically involve operating temperatures in the range of from 200-500° C., suitably from 250-400° C., hydrogen pressures in the range of from 10-200 bar, suitably from 15-100 bar, more suitably from 15-65 bar, weight hourly space velocities in the range of from 0.1-10 hr$^{-1}$, suitably from 0.2-5 hr$^{-1}$, more suitably from 0.5-3 hr$^{-1}$ and hydrogen to oil ratios in the range of from 100-2,000 litres of hydrogen per litre of oil. In the dewaxing catalyst to be used the weight ratio of the metallosilicate crystallites and the binder is preferably between 5:95 and 35:65. Preferred dewaxing catalysts to be used in accordance with the present invention have been described in U.S. Pat. No. 6,576,120 which is hereby incorporated by reference.

The dewaxed product obtained in the catalytic dewaxing step according to the invention can be subjected to a hydrofinishing step. Hydrofinishing is known in the art and examples of suitable hydrofinishing steps are disclosed in, for instance, U.S. Pat. No. 5,139,647, WO-A-9201657 and WO-A-9201769. Generally, hydrofinishing comprises contacting a hydrocarbon feed, in this case a feed comprising the dewaxed lubricating base oil, with a hydrogenation catalyst under relatively mild conditions in order to saturate at least part of the aromatics still present in the dewaxed base oil. Suitable catalysts are those normally applied for this purpose with noble metal-based catalysts, such as those comprising Pt and/or Pd supported on an amorphous silica-alumina carrier or comprising Pt on an alumina support, being preferred options. Hydrofinishing conditions normally involve operating temperatures up to 350° C. and preferably in the range of from 150-300° C., operating pressures in the range of from 10-200 bar and weight hourly space velocities in the range of from 0.5-7.5 hr$^{-1}$.

The effluent from the catalytic dewaxing process or optionally the effluent of a hydrofinishing treatment applied subsequently is separated into a gaseous fraction and a liquid fraction. Such separation or fractionation can be attained by conventional methods, such as by distillation under atmospheric or reduced pressure. Of these, distillation under reduced pressure, including vacuum flashing and vacuum distillation, is most suitably applied. The cutpoint(s) of the distillate fraction(s) is/are selected such that each product distillate recovered has the desired properties for its envisaged application.

That which is claimed is:

1. A process for preparing a dewaxed product comprising the steps of:
   (a) providing a hydrocarbonaceous feedstock which contains more than 4% by weight of hydrocarbons boiling in a range of from 550 to 800° C. and a ratio of hydrocarbons boiling in a range of from 370-543° C. to hydrocarbons boiling in a range of from 550-800° C. of less than 25;
   (b) hydrotreating the hydrocarbonaceous feedstock with a hydrotreating catalyst in the presence of a hydrogen-containing gas under hydrotreating conditions to obtain a hydrotreated product;
   (c) hydrocracking at least part of the hydrotreated product as obtained in step (b) with a hydrodenitrification catalyst comprising (i) Mo, (ii) Ni and/or Co, and (iii) alumina and a hydrocracking catalyst in the presence of a hydrogen-containing gas under hydrocracking conditions to obtain a hydrocracked product, wherein the hydrodenitrification catalyst is arranged upstream of the hydrocracking catalyst, wherein the hydrocracking catalyst comprises zeolite Y in an amount of from 18 to 30 wt % and amorphous silica-alumina in an amount of less than 50 wt %, based on the total weight of the hydrocracking catalyst, wherein the zeolite Y has a Si/Al ratio in the range of from 8-50, and wherein a volume ratio of the hydrotreating catalyst as used in step (b) to the hydrocracking catalyst is in the range of from 2 to 4; and
   (d) recovering the hydrocracked product as obtained in step (c), wherein at least part of hydrocarbons contained in the hydrocracked product is recycled to step (b) and wherein a hydrowax product is recovered from the hydrocracked product; and
   (e) contacting the hydrowax product with a dewaxing catalyst, comprising metallosilicate crystallites, a binder, and a hydrogenation component, under catalytic dewaxing conditions to yield the dewaxed product having a pour point of at least 10° C. less than a pour point of the hydrowax product.

2. A process according to claim 1, wherein the hydrocarbonaceous feedstock as provided in step (a) contains more than 8% by weight of hydrocarbons boiling in a range of from 550 to 800° C.

3. A process according to claim 1, wherein the hydrocarbonaceous feedstock as provided in step (a) contains between 8-30% by weight of hydrocarbons boiling in a range of from 560 to 800° C.

4. A process according to claim 1, wherein the hydrocracking catalyst also comprises an amorphous silica-alumina in an amount of less than 45 wt %, based on the total weight of the hydrocracking catalyst.

5. A process according to claim 1, in which the hydrotreating conditions in steps (b) comprise a temperature in a range of from 250-480° C., a pressure in the range of from 30-250 bar, and a weight hourly space velocity in a range of from 0.2-10 hr$^1$.

6. A process according to claim 1, in which the hydrocracking conditions in steps (c) comprise a temperature in a range of from 350-460° C., a pressure in the range of from 80-240 bar, and a weight hourly space velocity in a range of from 0.4-7 hr$^1$.

7. A process according to claim 1, wherein the entire hydrotreated product as obtained in step (b) is subjected to the hydrocracking in step (c).

8. A process according to claim 1, wherein the hydrotreating catalyst as used in step (b) comprises one or more metals from Groups VB, VIB and/or VIII of the Periodic Table of the Elements, on a solid carrier.

9. A process according to claim 1, wherein the hydrocracking catalyst as used in step (c) comprises one or more metals from Groups VIB and/or VIII of the Periodic Table of the Elements.

* * * * *